Figure 1:
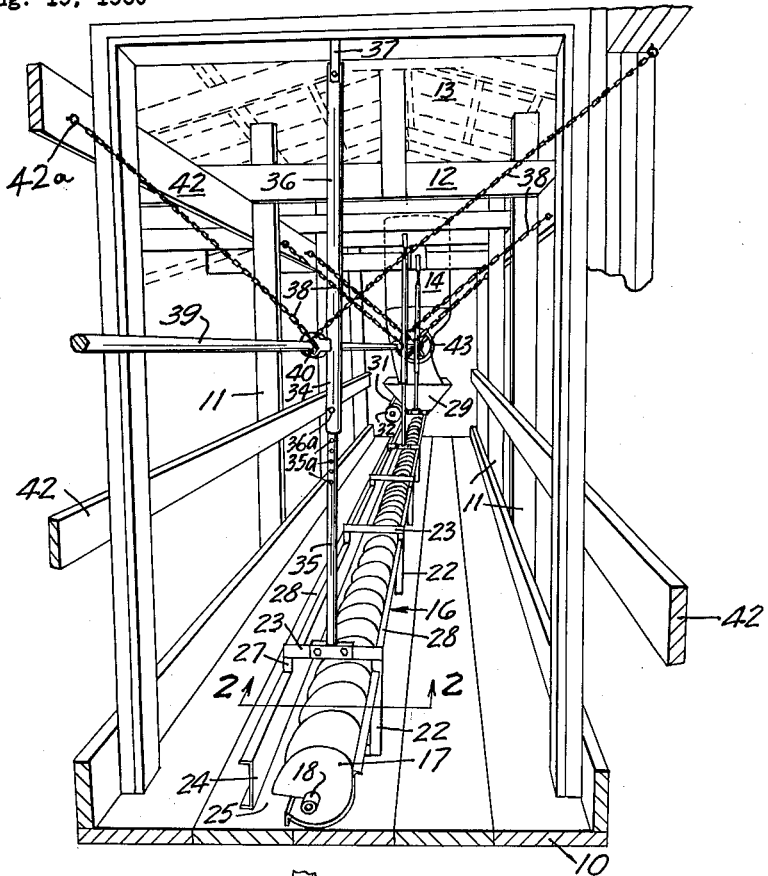

Sept. 17, 1963 S. H. SIME 3,103,913
AUGER BUNK FEEDER
Filed Aug. 19, 1960 2 Sheets-Sheet 1

INVENTOR
SYLVAN H. SIME
Williamson, & Palmatier
ATTORNEYS

Sept. 17, 1963 — S. H. SIME — 3,103,913
AUGER BUNK FEEDER
Filed Aug. 19, 1960 — 2 Sheets-Sheet 2
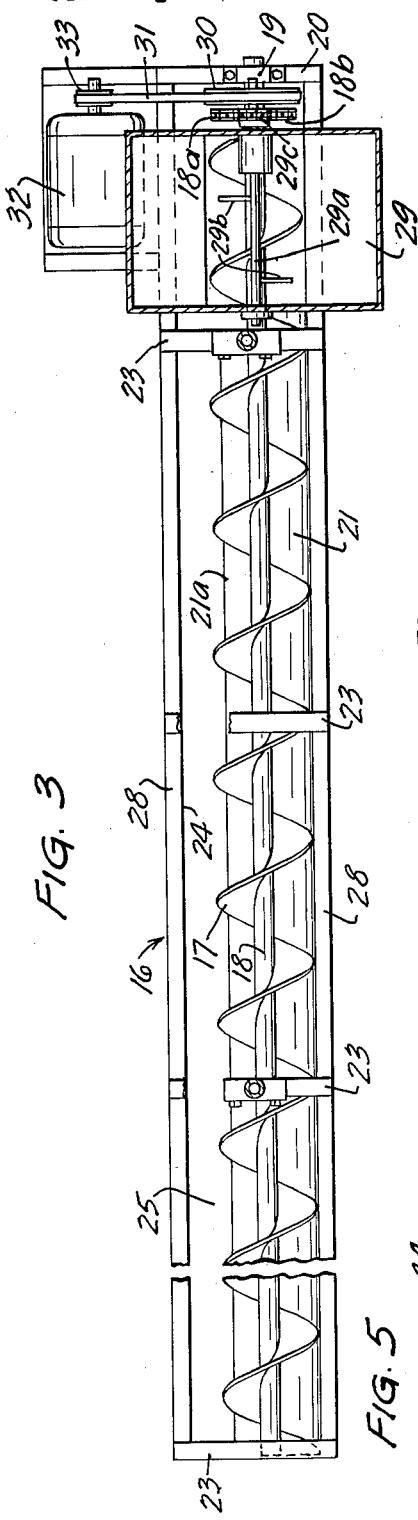
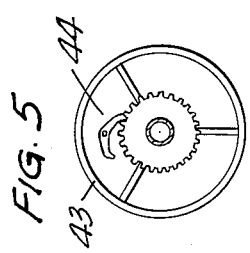
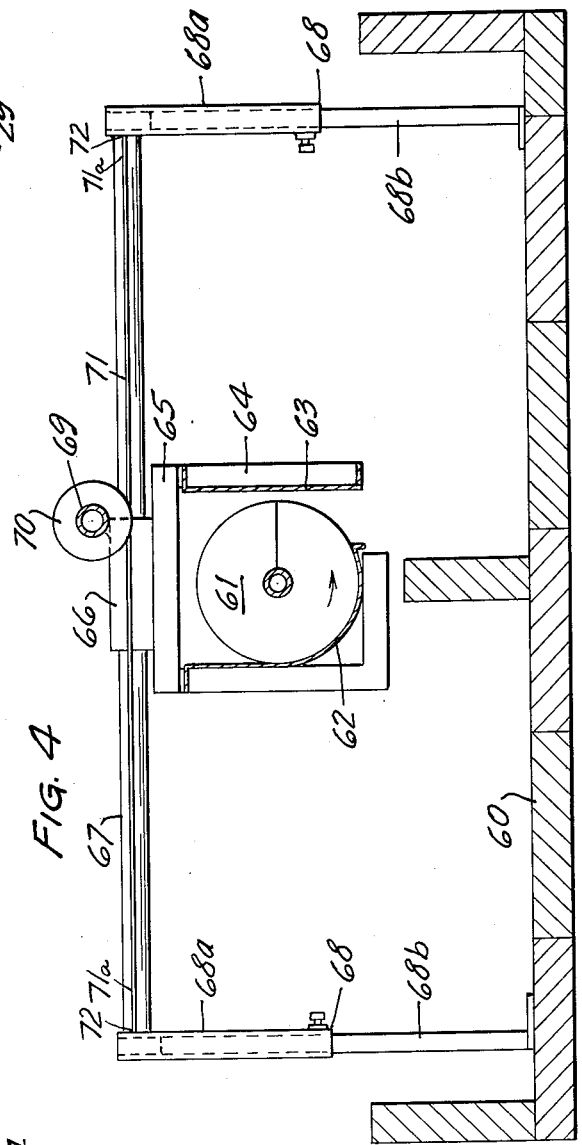
INVENTOR
SYLVAN H. SIME
BY Williamson & Palmatier
ATTORNEYS United States Patent Office 3,103,913
Patented Sept. 17, 1963

3,103,913
AUGER BUNK FEEDER
Sylvan H. Sime, Kiester, Minn.
Filed Aug. 19, 1960, Ser. No. 50,640
5 Claims. (Cl. 119—52)

This invention relates to livestock feeding apparatus and more particularly relates to a bunk filler and feed mixing apparatus.

Bunk fillers have been used extensively in the past, but these have had several disadvantageous aspects. It is frequently difficult to place enough feed in the bunk, per foot of length, to feed the desired number of cattle and further, if the bunk is made large enough to carry a large windrow of feed, the cattle cannot easily reach the feed after the first portions are gone. It frequently happens that wind will blow valuable portions of the feed out of the bunk, while the bunk is being filled. It has also been found with many bunk fillers that the various components of the feed mixture will separate and the cattle will quickly eat the more tasty feed and will leave the rest. In this regard it has been found in many instances the reason for separation is the different consistency of feed being mixed and fed. Some of the consistencies are fine meal, kernals or pellets, fibrous material such as stems of grass or alfalfa, poorly cut material such as shredded corn husk, large pieces of corn cob and sticky feeds such as certain stages of grass silage. Mixtures of these types of feed tend to separate when the mixture drops a distance and falls on top of the resulting conical pile of feed.

With these comments in mind, it is to the elimination of these and other disadvantages that the present invention is directed along with the inclusion therein of other novel and desirable features.

An object of my invention is to provide a new and improved bunk feeding apparatus of simple and inexpensive construction and operation.

Another object of my invention is the provision of a novel bunk filling apparatus which is well adapted for supplying feed mixtures in well mixed condition in ample quantities for feeding livestock so that feed is readily accessible to the livestock.

A further object of my invention is to provide a novel and improved feed augering device for supplying various types of feed to bunks and the like with a minimum of power and without causing separation of the various types of feed.

Figure 2:
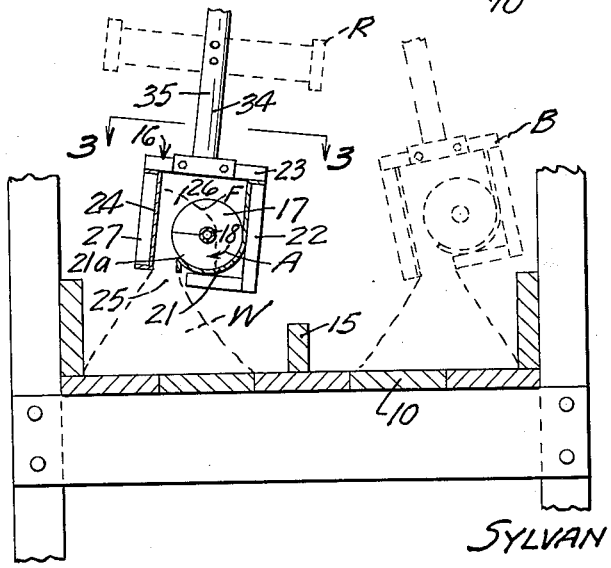

These and other objects and advantages of my invention will more fully appear from the following description made in connection with the accompanying drawings wherein like reference characters refer to the same or similar parts throughout the several views and in which:

FIG. 1 is a perspective view of the invention;
FIG. 2 is an enlarged detail section view taken approximately at 2—2 in FIG. 1;
FIG. 3 is an enlarged section view taken approximately at 3—3 in FIG. 2, with a portion of the structure being broken away;
FIG. 4 is an enlarged section view transversely across a modified form of the invention, and
FIG. 5 is an enlarged detail view of a portion of the apparatus.

One form of the invention is shown in FIGS. 1–3 and is described herein.

A feed bunk 10 is supported on suitable posts 11, the upper ends of which are interconnected by cross bars or joists 12 which may, if desired, provide the supporting structure for a roof 13 which is shown in dotted lines. One end of the bunk 10 is disposed beneath the unloading tube 14 of a silo, or other convenient supply of feed.

The bunk 10 also has an upright wall 15 midway between the opposite sides to divide the bunk into a pair of longitudinally extending side-by-side compartments. In this arrangement livestock may feed from both sides of the bunk. Furthermore, as will hereinafter be more fully pointed out, the rations deposited in each side of the bunk may be different, if different types or grades of livestock are being fed.

The feed is conveyed to and distributed along the bunk 10 from the supply tube 14 by an auger conveyor which is indicated in general by numeral 16. The auger conveyor includes the conventional helicoid 17 having a center shaft 18. One end of shaft 18 is carried in a thrust bearing 19 which is carried by the end frame 20. The helicoid 17 is supported on its peripheral edge by an elongate, arcuately curved cradling plate 21 which extends downwardly around one side of the helicoid and through a vertical plane which includes the rotation axis and to an edge 21a thereof which is spaced from said vertical plane. The curvature of the plate 21 is substantially identical to the curvature of the periphery of the helicoid 17 so that the helicoid is supported over a substantial surface area. The plate 21 extends throughout the entire length of the helicoid 17 and is supported by a plurality of substantially L-shaped members 22, the lower portions of which underlie the plate 21 and upper portions of which lie against the side of plate 21. It will be noted that none of the frame members 22 project horizontally beyond the edge 21a of the plate. The plate 21 is affixed to the frame members 22 as by welding and the frame members 22 are affixed at their upper ends to cross bars 23 which extend transversely across the helicoid 17 in spaced relation thereabove.

An elongate and substantially planar feed-confining plate 24 is positioned in spaced and confronting relation with the other side of helicoid 17 and with the edge 21a so as to define an elongate and continuous, unbroken feed-discharging slot 25 adjacent the edge 21a and also to define an elongate and continuous unbroken feed-conveying area 26 adjacent the helicoid. The plate 24 is supported by a plurality of upright frame elements 27 which are welded to the outer side of the plate 24 and which are affixed as by welding at their upper ends to the cross bar 23. It will be noted that longitudinally extending angle bars 28 extending along the outer sides of the plates 21 and 24 and are affixed as by welding to the frame parts 22 and 27 for rigidifying the structure and tying the structure solidly together.

A hopper 29 is provided at the supply end of the auger conveyor and is supported on the elongate frame members 28 so as to direct feed from the chute 14 into the helicoid. A pulley 30 is mounted on a shaft 29a which extends through the hopper 29 and may have a number of protruding pins 29b or other similar elements which produce an agitating effect in the hopper when revolved with the shaft 29a. The shaft 29a also has a small sprocket 29c affixed thereon and connected by means of a roller chain 18a to a large sprocket 18b which is affixed on the auger shaft 18. A motor 32 is affixed by brackets to one of the elongate frame members 28 and is connected by means of pulley 33 and belt 31 to the pulley 30. The desired speed at auger 17 is provided by the speed-reducing action of the large and small pulleys and sprockets. It should be understood that the shaft 29a might be employed to drive a concentrate metering device if it is desired to add concentrate to the feed.

The entire helicoid and supporting framework therefor, including plates 21 and 24 and the frame members and cross pieces 23 are suspended on elongate upright telescoping rods 34, the lower sections 35 of which are bolted to certain of the cross members 23, and the upper sections 36 of which are swingably supported on brackets 37 to permit swinging of the auger conveyor in a side-to-side direction above the bunk 10. The brackets 37 are bolted to the joists or cross members 12. It will be seen that the upper and lower telescoping sections 36 and 35 may be adjusted with respect to each other in order to properly adjust the elevation of the auger conveyor above the bunk 10, and to this end, the lower section 35 has a plurality of apertures 35a therein and the upper section also has apertures receiving bolts 36a which also extend through certain of the apertures 35a in the lower sections.

Means are provided for moving the auger conveyor in a side-to-side direction above the bunk 10 and in the form shown such means includes a plurality of elongate flexible elements or chains 38 spaced from each other along the length of the auger conveyor. Each of the chains 38 is wrapped several times around an elongate shaft 39 which extends throughout the entire length of the auger conveyor and which is carried in suitable bearings 40 on the upper sections 36 of the telescoping support rods 34. The chains 38 are maintained in a substantially taut condition and the opposite ends of each of the chains extend in opposite directions toward the sides of the bunk. The ends of chains 38 are suitably anchored at opposite sides of the bunk and in the form shown the chains 38 are anchored by fasteners 42a to longitudinal frame elements 42 which are affixed to the upright post 11 and serve to tie the supporting structure together.

The shaft 39 is provided with a large hand wheel 43 at one end for rotating the shaft, and a double-acting ratchet and pawl mechanism 44 which serves to prevent rotation of the shaft 39 in either direction, but is releasable to permit the desired rotation of the shaft.

In the operation of the invention, feed is supplied from the chute 14 into the hopper 29 and into the auger conveyor. The motor 32 is operated in order to revolve the helicoid and it should be particularly noted that the helicoid 17 is rotated in the direction of arrow A so that the helicoid, in its underpassing arc of rotation moves outwardly toward and over the edge 21a of plate 21. This direction of rotation of the helicoid 17 causes the helicoid to stay in engagement with the upright portion of the cradling plate 21 and because of the large wearing surface, due to the substantially identical curvature of the helicoid periphery of the plate 21, the helicoid runs smoothly on the plate. As the helicoid 17 is revolved in the direction of arrow A, the feed supplied from the hopper 29 will drop through the feed-discharging slot 25 and will form an elongate mound or windrow W of feed in the bunk 10. When a windrow W has been formed under one end of the auger conveyor, the feed being carried and supplied by the helicoid will longitudinally move through the area 26 and the feed being moved will stay mostly to one side of the helicoid, substantially within the area indicated by the dotted lines F in FIG. 2. Only small amounts of feed will be disposed in the helicoid at the opposite side thereof and these small portions are immediately moved over into the area 26. There will be sufficient feed on the plate 21 so as to adequately lubricate the helicoid as it revolves.

It should be pointed out that as the feed moves along the area 26 and is deposited on the bunk at the outer end of the windrow, there is substantially no separation of the various types of feed which may be intermixed. All portions of the feed, whether light or heavy, granular or stringy, are well mixed when deposited upon the bunk. It should be further noted that because the slot between plate 24 and edge 21a is open and unobstructed throughout its entire length, and because the area 25 is unobstructed throughout its entire length, there is no tendency whatever for the stringy types of feed such as chopped grass to collect or otherwise obstruct the movement of other feed. It will therefore be seen that the auger conveyor is light running and substantially all of the power used is applied for actual moving of the feed being carried along the length of the helicoid. The auger and shaft is mounted free of actual bearings except for thrust bearing 19 and as a result there is no obstruction or other apparatus to clog against free flow of the feed resulting in free and easy running and no freezing in cold weather.

When a windrow W of feed is formed along the entire length of the helicoid, the open bottomed trough defined by plates 21 and 24 may be easily emptied by merely rotating the hand wheel 43 so as to swing the helicoid sideways over the bunk. If the supply from the chute is cut off, and the auger is let run for a few moments after the auger has been moved to one side, all of the feed in the area 26, in the slot 21, and the feed confined by the helicoid will drop down from the slot 25 so as to completely empty the helicoid and the trough. It will be seen that by completely removing all of the feed in this fashion there will be and is no problem of freezing of feed during cold weather. As a result, the instant invention is well adapted for outdoor use. Of course the roof 13 is desirable to protect the mechanisms and the cattle while eating.

It should also be noted that supplying of the feed may be carried on while the cattle are actually eating because the sides of the helicoid are completely confined and there is no possibility of cattle getting their tongues in the auger or otherwise getting hurt. It should further be noted that because the auger may be quickly and easily emptied as hereinbefore described, the motor 22 need not have any special high starting torque characteristics because when the motor is first started only the helicoid is to be turned.

By first forming a windrow in approximately the position shown in FIG. 2, cattle at the corresponding side of the bunk can easily reach the feed without requiring a person to get in the bunk and shovel the feed back over to the cattle. After the windrow has been formed the auger conveyor can be moved into the other side of the bunk as shown in the dotted line B in FIG. 2 so as to produce another windrow on that side of the bunk. It should be noted here that the bunk 10 may divide a feed lot such that one type or grade of livestock is kept at one side of the bunk and another grade or type of livestock is keept at the other side of the bunk. The formula of feed supplied at opposite sides of the bunk may be different for these different types or grade of livestock.

It is to be noted that the helicoid 17 may be adjusted close to the bunk 10 so that the windrows W are of low height to prevent the wind from blowing the feed away. Even though the windrow W is of low height, additional feed may be applied in the same side of the bunk by merely moving the auger conveyor sideways slightly so as to effectively form another windrow in the same side of the bunk.

Ordinarily, after the bunk has been filled, the auger conveyor will be positioned approximately at the center of the bunk to be out of the way as cattle are feeding. It may be desirable to clamp wood rails R, shown in dotted lines, to the bottom section of the telescoping rod 34 so as to extend along the side of the bunk, above the bunk wall, when the auger is disposed substantially in the center of the bunk so as to prevent the cattle from climbing in the bunk.

The form of the invention shown in FIG. 4 is substantially similar to that shown in FIGS. 1–3. In this form of the invention, the bunk 60, helicoid 61, helicoid-cradling plate 62, feed-confining plate 63 and the frame structure 64 are substantially identical to that shown in the other form of the invention. In this form of the invention the cross bars 65 have sleeves 66 affixed thereto and extending transversely of the bunk. A plurality of supporting cross bars on rods 67 extend through sleeve 66 and permit sliding of the sleeve 66 therealong.

The cross bars 67 are supported on telescoping rods 68, the upper and lower sections 68a and 68b are adjustable with respect to each other for regulating the elevation of the helicoid. A shaft 69 extends along the length of the helicoid and is mounted in suitable bearings 70 on the sleeve 66 and has a cable 71 wrapped therearound and having ends 71a anchored as by fasteners 72 to the telescoping members 68. Of course the shaft 69 will have means for rotating the shaft such as the hand wheel 43 of the other form of the invention. This form of the invention has the advantage of eliminating the need for a supporting structure of substantial height. As in the other form of the invention, the feed will be deposited in windrows and the auger conveyor has all of the advantages hereinbefore set forth.

It will, of course, be understood that various changes may be made in the form, detail, arrangement and proportion of the parts without departing from the scope of my invention which consists of the matter described herein and set forth in the appended claims.

What is claimed is:

1. A livestock feeding apparatus comprising an elongate bunk having upright sidewalls with upper edge portions, the bunk having an unobstructed space transversely between the upper edges of said sidewalls and extending all along the bunk, an auger conveyor having downwardly opening discharging means along the length thereof, said conveyor extending along the bunk and being spaced above the bunk between the sidewalls thereof and being disposed immediately above said unobstructive space, said discharging means supplying and distributing feed downwardly through said unobstructed space and into the bunk and all along the bunk without interference or interruption, a plurality of conveyor mounts along the conveyor and secured thereto, means supporting said mounts to permit movement thereof and of the conveyor toward and away from opposite sidewalls of the bunk, a rotary shaft extending along the conveyor and journaled on said mounts, means for controlling rotation of said shaft, a plurality of elongate flexible elements wound on the shaft in spaced relation with each other and each of said elements having opposite ends respectively extending in opposite directions toward opposite sides of the bunk, and means anchoring said ends of the flexible elements at opposite sides of the bunk.

2. The invention set forth in claim 1 and said bunk having an upstanding divider wall intermediate the opposite sides thereof and extending upwardly to said unobstructed space and also extending longitudinally through the bunk to divide the bunk into separate feed-confining areas to confine the feed in readily accessible position adjacent the opposite sides of the bunk and to permit different types of feed to be spread on opposite sides of the bunk without intermixing thereof.

3. Livestock feeding apparatus comprising a bunk having upright sidewalls and defining an unobstructed space transversely between the sidewalls, an auger conveyor spaced above the bunk and extending therealong for supplying and distributing feed along the bunk, said conveyor having downwardly opening discharging means along the length thereof and disposed immediately above said unobstructed space and discharging feed downwardly therethrough, a plurality of auger conveyor-suspending rods connected in supporting relation with the conveyor and extending upwardly therefrom, means pivotally mounting the upper ends of said rods and permitting swinging of the rods and conveyor in a side-to-side direction, a rotary shaft extending along the conveyor and journaled on said rods above the conveyor, means for controlling rotation of said shaft, a plurality of elongate flexible elements wound on the shaft in spaced relation with each other, and each of said elements having opposite ends respectively extending in opposite directions toward opposite sides of the bunk, and means anchoring said ends of said flexible elements at opposite sides of the bunk, and said flexible elements being of such length as to be normally in a taut condition.

4. Livestock feeding apparatus comprising a bunk having upright sidewalls and defining an unobstructed space transversely between the sidewalls, an auger conveyor spaced above the bunk and extending therealong for supplying and distributing feed along the bunk, said conveyor having downwardly opening discharging means along the length thereof and disposed immediately above said unobstructed space and discharging feed downwardly therethrough, a plurality of auger conveyor suspending rods secured to the auger conveyor and in supporting relation and extending upwardly therefrom, each of said rods including a telescopically related upper and lower section to facilitate placement of the auger conveyor at various elevations above the bunk, releasable means securing said upper and lower rod sections in desired positions, means pivotally mounting the upper sections of said rods and permitting swinging of the rods and conveyor in a side-to-side direction to facilitate laying of the feed in a number of side-by-side rows in the feed bunk, a rotary shaft extending along the conveyor and journaled on the upper sections of said rods, means for controlling rotation of said shaft, a plurality of elongate flexible elements wound on the shaft and in spaced relation with each other, each of said flexible elements having opposite ends respectively extending in opposite directions toward opposite sides of the bunk, and means anchoring said ends of said flexible element at opposite sides of the bunks whereby to cause, as said shaft is turned, movement of the auger conveyor toward and away from the sides of the bunk.

5. Livestock feeding apparatus comprising a bunk having upright sidewalls and defining an unobstructed space transversely between the sidewalls, an auger conveyor spaced above the bunk and extending therealong for supplying and distributing feed along the bunk, said conveyor having downwardly opening discharging means along the length thereof and disposed immediately above said unobstructed space and discharging feed downwardly therethrough a plurality of rigid rods spaced from each other along the bunk and extending transversely across the bunk above the auger conveyor, a plurality of conveyor mounts movably supported on said rods for moving the auger conveyor transversely across the bunk, a rotary shaft extending along the conveyor and journaled on said mounts, means for controlling rotation of said shaft, a plurality of elongate flexible elements wound on the shaft in spaced relation with each other and each of said elements having opposite ends respectively extending in opposite directions toward opposite sides of the bunk and means anchoring said ends of said flexible elements at opposite sides of the bunk, whereby rotation of the shaft will cause said mounts to slide along said rods to move the auger conveyor toward or away from the opposite sides of the bunk.

References Cited in the file of this patent

UNITED STATES PATENTS

| | | |
|---|---|---|
| 2,793,615 | Kerkvliet | May 28, 1957 |
| 2,827,156 | Linder | Mar. 18, 1958 |
| 2,842,258 | Rupp et al. | July 8, 1958 |
| 2,970,568 | Johnson | Feb. 7, 1961 |